United States Patent
Unrath, Sr.

(10) Patent No.: US 7,441,817 B1
(45) Date of Patent: Oct. 28, 2008

(54) TRAILER MOUNTED CRASH ATTENUATION SYSTEM

(75) Inventor: Albert W. Unrath, Sr., Line Lexington, PA (US)

(73) Assignee: TMA Acquisition, LLC, Rio Vista, CA (US)

( * ) Notice: Subject to any disclaimer, the term of this patent is extended or adjusted under 35 U.S.C. 154(b) by 0 days.

(21) Appl. No.: 11/788,902

(22) Filed: Apr. 23, 2007

(51) Int. Cl.
*B60R 19/38* (2006.01)

(52) U.S. Cl. ............... 293/118; 293/102; 404/6

(58) Field of Classification Search ......... 296/187.03, 296/203.01, 187.09, 187.02; 293/102, 118; 404/6

See application file for complete search history.

(56) References Cited

U.S. PATENT DOCUMENTS

| | | | | |
|---|---|---|---|---|
| 4,537,374 A | * | 8/1985 | Barnoin et al. | 244/102 R |
| 4,711,481 A | * | 12/1987 | Krage et al. | 293/133 |
| 5,052,732 A | * | 10/1991 | Oplet et al. | 293/102 |
| 5,248,129 A | * | 9/1993 | Gertz | 293/133 |
| 5,947,452 A | * | 9/1999 | Albritton | 293/133 |
| 6,098,767 A | * | 8/2000 | Unrath | 293/133 |
| 6,364,400 B1 | * | 4/2002 | Unrath | 296/1.05 |
| 6,579,034 B1 | * | 6/2003 | Welch et al. | 404/6 |
| 6,619,491 B2 | * | 9/2003 | Payne et al. | 213/221 |
| 6,866,284 B2 | * | 3/2005 | Carlsson | 293/118 |
| 7,125,198 B2 | * | 10/2006 | Schiefferly et al. | 404/6 |
| 7,341,397 B2 | * | 3/2008 | Murphy | 404/6 |
| 2004/0120760 A1 | * | 6/2004 | Carlsson | 404/6 |

* cited by examiner

*Primary Examiner*—Kiran B. Patel
(74) *Attorney, Agent, or Firm*—Thomas R. Lampe

(57) ABSTRACT

A trailer crash attenuation assembly includes a longitudinal hollow member adapted to act as a hydraulic cylinder at one end, hydraulic fluid disposed in the hydraulic cylinder and a tank connected to the hydraulic cylinder to receive and store said hydraulic fluid expressed from the hydraulic cylinder. A first longitudinal telescopic member is adapted to slide into and out of the longitudinal hollow member and is adapted to act a piston. Two other longitudinal hollow members are positioned substantially parallel to and on either side of the first longitudinal hollow member and are connected to the first longitudinal hollow member. Two telescopic members are adapted to slide into and out of the two other longitudinal hollow members respectively. A casing is connected at its proximal end to all three longitudinal hollow members, is adapted at its distal end to receive a crash cushion; and has a pair of wheels.

15 Claims, 4 Drawing Sheets

US 7,441,817 B1

TRAILER MOUNTED CRASH ATTENUATION SYSTEM

FIELD OF THE INVENTION

The present invention relates to vehicle crash attenuation systems, and particularly to trailer mounted crash attenuation systems.

BACKGROUND OF THE INVENTION

Crash attenuation devices have been developed for mounting on vehicles that are parked or moving slowly on roadways, for example at construction or maintenance sites, in order to attenuate the impacts from collisions with the parked vehicle. Often times, vehicles equipped with crash attenuators are purposely deployed around work sites to shield workers at the site from being hit. Instead, errant vehicles strike the attenuator which arrests the motion of the errant vehicle and dissipating its impacting energy. Examples of these attenuation devices are disclosed in U.S. Pat. Nos. 6,186,565, 6,098,767, 5,052,732, 4,635,981, and 4,658,941.

SUMMARY OF THE INVENTION

In one embodiment of the invention, a trailer crash attenuation assembly includes a first longitudinal hollow member, a portion at one end of which is adapted to act as a hydraulic cylinder and has a relatively small orifice, hydraulic fluid disposed in the hydraulic cylinder, and a tank fluidly connected to the first longitudinal hollow member through the relatively small orifice. The tank is adapted to receive and store hydraulic fluid expelled from the hydraulic cylinder through the relatively small orifice. The assembly also includes a first longitudinal telescopic member which is adapted to slide in and out of the first longitudinal hollow member and is adapted to act as a piston in the hydraulic cylinder. The assembly further includes two other longitudinal hollow members positioned substantially parallel to and on either side of the first longitudinal hollow member. The second and third longitudinal hollow members are connected to the first longitudinal hollow member. Two longitudinal telescopic members are adapted to slide in and out of the second and third longitudinal hollow members. The assembly also includes a casing which is connected to the first, second and third longitudinal hollow members on end, whereas it adapted to be connected to a crash cushion on the other end. The casing has a pair of wheels.

In another embodiment of the invention, the second and third longitudinal hollow members may be fitted with a similar hydraulic system to allow for greater absorption of the impact energy.

BRIEF DESCRIPTION OF THE DRAWINGS

Understanding of the present invention will be facilitated by considering the following detailed description of the preferred embodiments of the present invention taken in conjunction with the accompanying drawings, in which like numerals refer to like parts, and.

DETAILED DESCRIPTION OF THE PREFERRED EMBODIMENTS OF THE INVENTION

It is to be understood that the figures and descriptions of the present invention have been simplified to illustrate elements that are relevant for a clear understanding of the present invention, while eliminating, for the purpose of clarity, many other elements found in crash attenuation systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
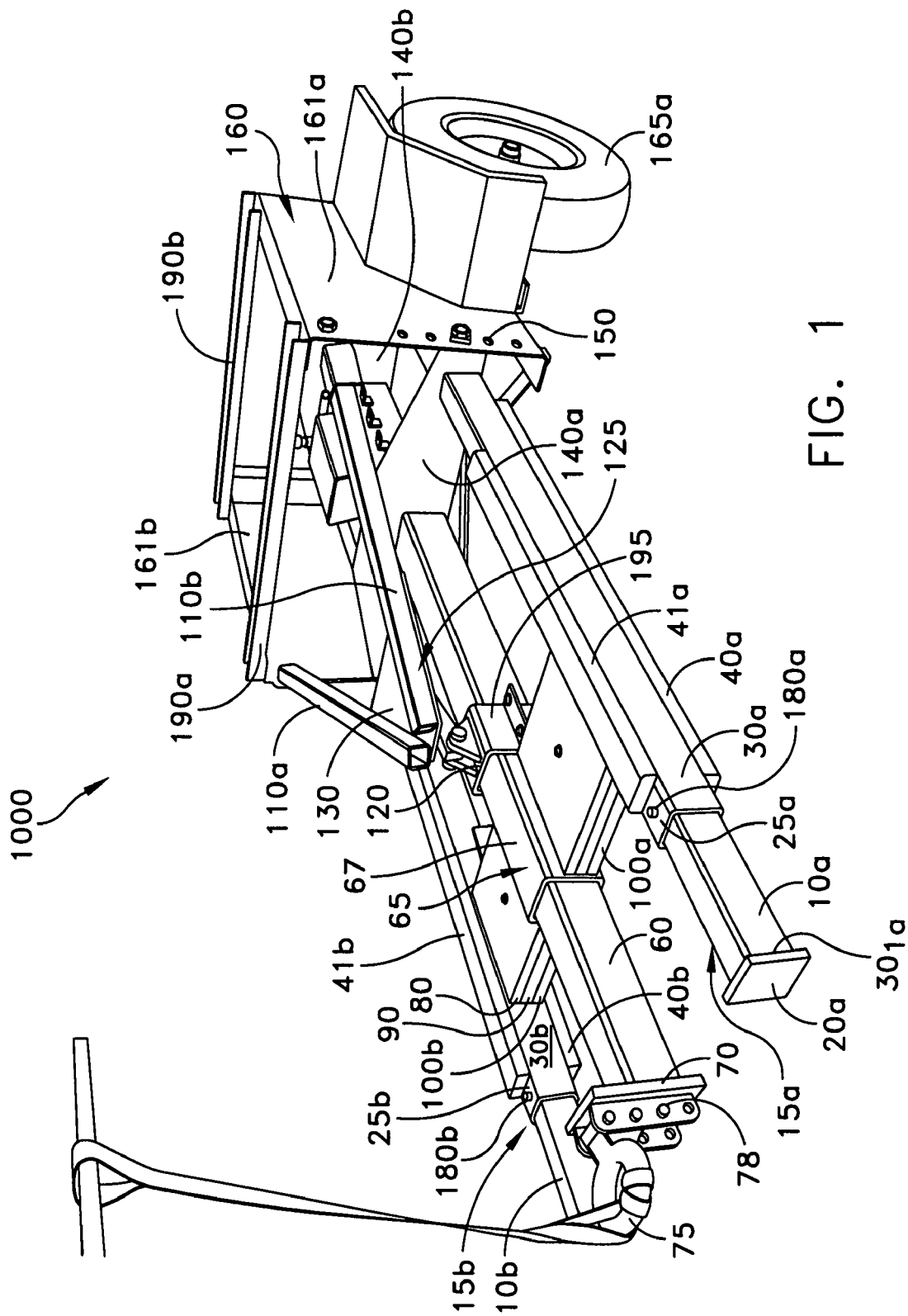
FIG. 1 shows a trailer mounted crash attenuation system as per an embodiment of the invention.
Figure 2:
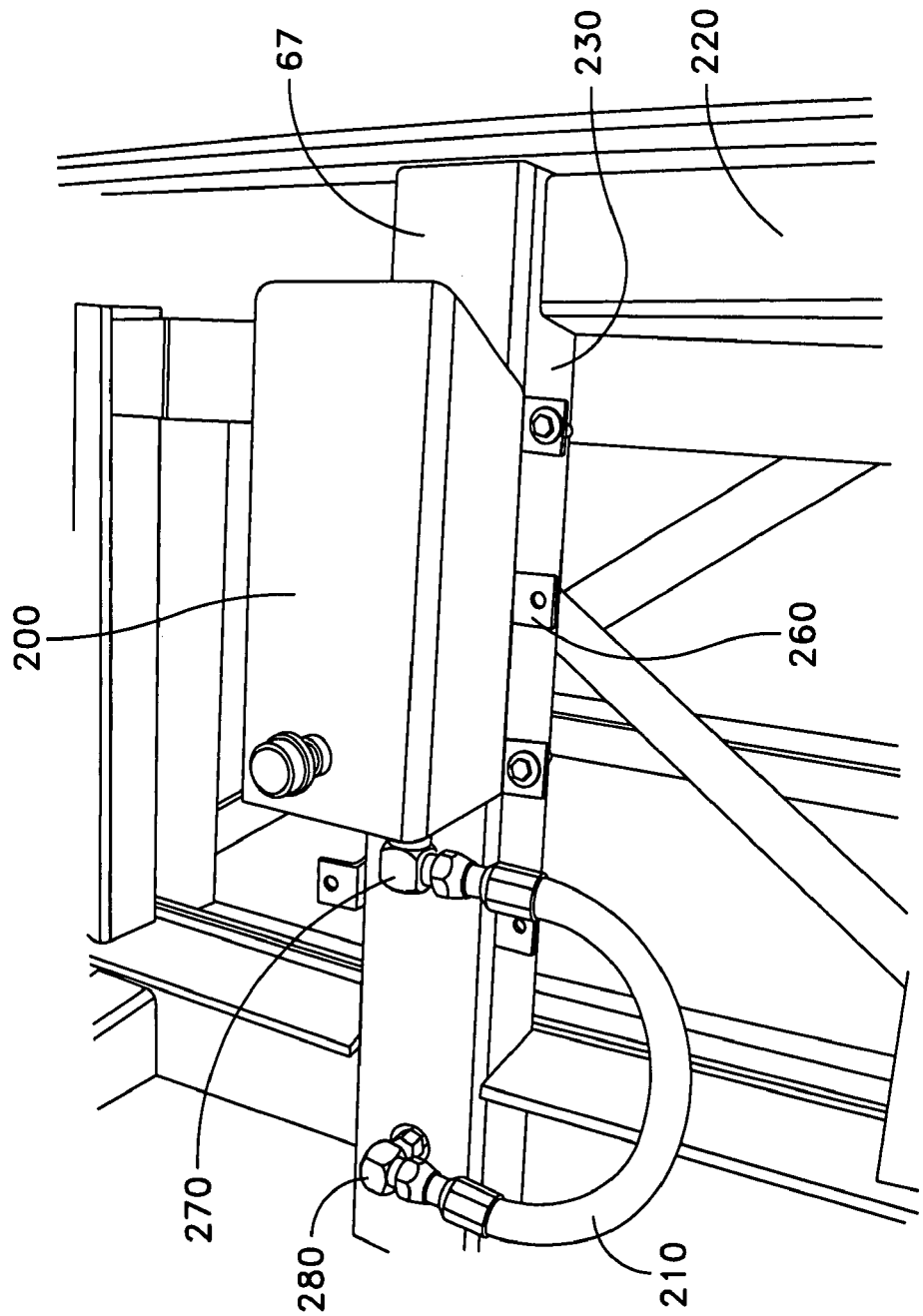
FIG. 2 shows some of the components of a hydraulic assembly which is a part of the trailer mounted crash attenuation system of FIG. 1.
Figure 3:
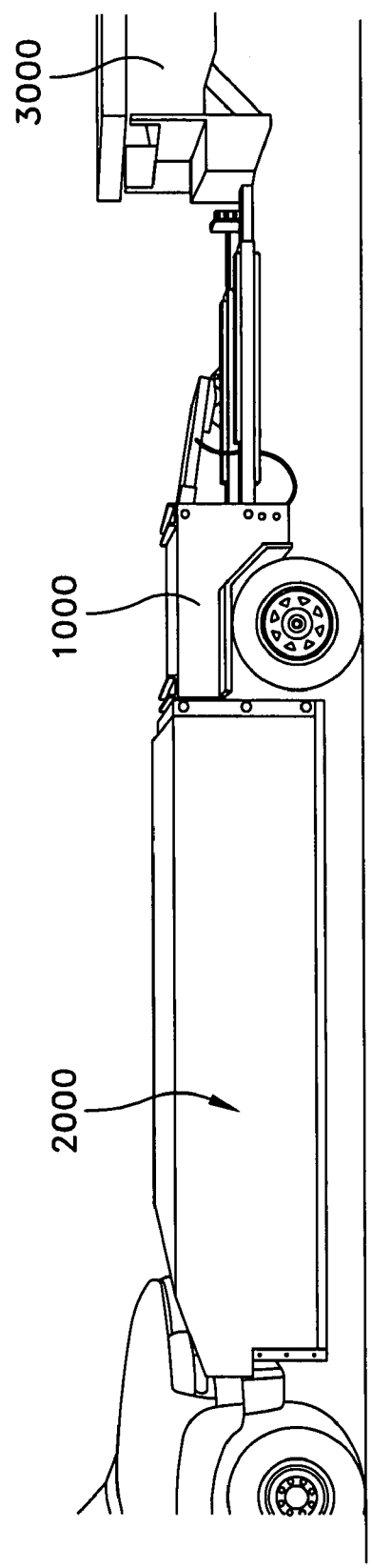
FIG. 3 shows a side view of a crash cushion mounted on a trailer, which is connected to a vehicle as per an aspect of the present invention.

Referring to FIGS. 1-3, a trailer crash attenuation assembly 1000 is shown. The trailer assembly 1000 is connected to a vehicle 3000 on one end, and to a crash attenuator or crash cushion 2000 on the other end. A longitudinal center arm 65 includes a hollow shell 67 and a telescopic arm 60, which can slide in and out of the hollow shell 67 at its proximal end. At the distal end of the hollow shell 67 is a hydraulic cylinder (415 of FIG. 4), which is filled, at least partially, with a hydraulic fluid. In a preferred embodiment, the hydraulic cylinder is completely filled with hydraulic fluid. In an exemplary embodiment, the hollow shell 67 and the telescopic arm 60 have a square cross-section. It will be understood that cross-sections of other shapes are also possible for the hollow shell 67 as well as the telescopic arm 60 so long as the telescopic arm can travel within the hollow shell.

At the proximal end of the telescopic arm 60 is a hitch height adaptor 70. A hitching hook 75 is bolted to the hitch height adaptor 70. The height of the hitching hook 75 can be adjusted by bolting the hook 75 at appropriate bolt holes 78 on the hitch height adaptor 70.

The trailer assembly 1000 also includes two longitudinal side-arms $15_a$ and $15_b$. Each side arm $15_a$ and $15_b$ includes a hollow shell $30_a$ and $30_b$ and a telescopic arm $10_a$ and $10_b$, respectively, such that telescopic arms $10_a$ and $10_b$ can slide in and out of the corresponding hollow shells $30_a$ and $30_b$. Each telescopic arm $10_a$ and $10_b$ has a respective stopper plate such as $20_a$ adapted to stop or prevent further telescoping motion by contact engagement with corresponding end portion $30_{1a}$ of hollow shell $30_a$ and corresponding end portion (not shown) of hollow shell $30_b$. The two side-arms $15_a$ and $15_b$ are substantially parallel to each other as well as to the center arm 65. In an exemplary embodiment, each side-arm $15_a$ and $15_b$ is equidistant from the center arm 65. Each hollow shell $30_a$ and $30_b$ has a respective opening $25_a$ and $25_b$ on a top (and/or bottom) surface thereof. Corresponding openings (not shown) are formed in the side arms $15_a$ and $15_b$ and are alignable with openings $25_a$ and $25_b$ so as to receive a fastening member such as shear bolts $180_a$ and $180_b$. Similarly, each of the hollow shell 67 and the telescopic arm 60 has an alignable opening to receive a fastening member such a shear bolt (420 of FIG. 4). In an exemplary embodiment, the telescopic arms are extended out from the hollow shells a predetermined amount (indicative of an extended position) and the bolts are inserted into the openings $25_a$ and $25_b$. It is understood that a number of openings may be spaced about the top (and/or bottom) surface of the side-arms to predefine various extension positions of the side-arms from the hollow end portions. In this manner, the side-arms are rigidly extended a given distance from the hollow shells.

In an exemplary embodiment, each of the hollow shells $30_a$ and $30_b$ has ballast plates $40_a$, $41_a$ and $40_a$, $40_b$ disposed on the upper and lower surfaces thereof, to provide structural rigidity and additional counterweights to balance the towing weight of the trailer 1000 when the trailer 1000 is attached to the vehicle 300.

Generally speaking, when fully extended out of the hollow shell 67, the telescopic arm 60 extends a distance further (longitudinally) than the telescopic arms $10_a$ and $10_b$, when they are fully extended from their respective hollow shells $30_a$ and $30_b$. Also, the stroke of telescopic arm 60 into the hollow shell 67 is longer than the strokes of the telescopic arms $10_a$ and $10_b$ in their respective hollow shells $30_a$ and $30_b$. In an exemplary embodiment, the telescopic arm 60 extends about one (1) foot longer than the fully extended telescopic arms $10_a$ and $10_b$. For illustrative purposes only, the telescopic arm 60 has a stroke of up to about eighteen (18) inches, whereas the telescopic arms $10_a$ and $10_b$ have a stroke of up to about twelve (12) inches. For safety considerations, there may be a reserve of about a quarter (¼) inch for the telescopic arm 60, so that the actual stroke is about seventeen and three-quarters (17¾) inches.

In an exemplary embodiment, the wall thickness of the hollow shell 67 is three-eighth (⅜) of an inch thick, while the wall thickness of the hollow shells $30_a$ and $30_b$ are about a quarter (¼) of an inch. The hollow shells 67, $30_a$ and $30_b$, as well as the telescopic arms 67, $10_a$ and $10_b$ can be made from known materials such as steel, for example A36 steel, or other such structurally rigid materials.

Referring again to FIG. 1, a plate $100_a$ is affixed between the center arm 65 and the side-arm $30_a$ and another plate $100_b$ is affixed between the center arm 65 and the side-arm $30_b$. Plates $100_a$ and $100_b$ provide structural support and rigidity to the center arm 65 and the two side-arms $20_a$ and $20_b$. In an exemplary embodiment, the plates $100_a$ and $100_b$ are welded to the center arm 65 and the side arms $15_a$ and $15_b$. In an exemplary embodiment, two plates 80 and 90 are affixed to each of the plates $100_a$ and $100_b$. The plates 80 and 90 are ballast plates and are which act as counterweights to the crash cushion 2000 mountable on the trailer assembly 1000. It will be understood that any objects which may act as a counterweight can be used in place of ballast plates 80 and 90.

A lock-down member 195 is mounted on the center arm 65. An adjustable connection 120 is affixed on the lock-down member 195. A stabilizer assembly 125 is connected at one end to the adjustable connection 120. The stabilizer assembly 125 includes two stabilizer tubes $110_a$ and $110_b$ and a web 130 which provides structural support to the stabilizer assembly 125. The stabilizer tubes $110_a$ and $110_b$ are connected at one end to a casing 160. The casing includes two plates $161_a$ and $161_b$. Generally, the stabilizer tubes $110_a$ and $110_b$ are connected to the top proximal ends of the plates $161_a$ and $161_b$, respectively. In an exemplary embodiment, the stabilizer tubes $110_a$ and $110_b$ have square cross-section. It will be understood that tubes with other cross-sectional shapes, such as square or round, may also be used without departing from the scope of the present invention. In an exemplary embodiment, such other cross-sectional shapes would have same cross-sectional wall areas as that of the square cross-section tubes.

A front diaphragm $140_a$ is connected to the casing 160 and also to the center arm 65 and the side arms $15_a$ and $15_b$. In an exemplary embodiment, the height of the front diaphragm $140_a$ can be varied by using appropriate bolt holes 150. Other known mechanisms may also be used to adjust the height of the front diaphragm $140_a$. Two transverse arm members $190_a$ and $190_b$ provide structural rigidity to the casing 160. In an exemplary embodiment, members $190_a$ and $190_b$ are U-shaped channels. Other beam type members may also be used, as is known in the art. A rear diaphragm $140_b$ is similar to the front diaphragm $140_a$ and is also connected to the casing 160 and also to the center arm 65 and the side arms $15_a$ and $15_b$.

The trailer assembly 1000 also includes two wheels $165_a$ and $165_b$ to enable the trailer assembly 1000 to be towed by a vehicle. The two wheels are coupled via an axle (not shown) and are disposed on either side of the casing 160. Trailer surge brakes may also be added, as is known in the art. The axle is generally positioned below the casing 160 and correctly positioned to obtain trailer balance.

Referring now to FIG. 2, there is shown a more detailed illustration of the distal end of the hollow shell 67 of the center arm 65 and casing 160 of FIG. 1. A hydraulic fluid overflow/storage tank 200 is mounted on the hollow shell 67 using known fastening means. At the distal end of the hollow shell is an outlet 280. A hydraulic hose or tube 210 is connected to the outlet 280 on one end. At the other end, the hydraulic hose 210 is connected to an inlet 270 of the hydraulic fluid overflow/storage tank 200. Installation of such a hydraulic system on the side-arms $15_a$ and $15_b$ is also contemplated to be within the scope of the present invention.

Figure 4:
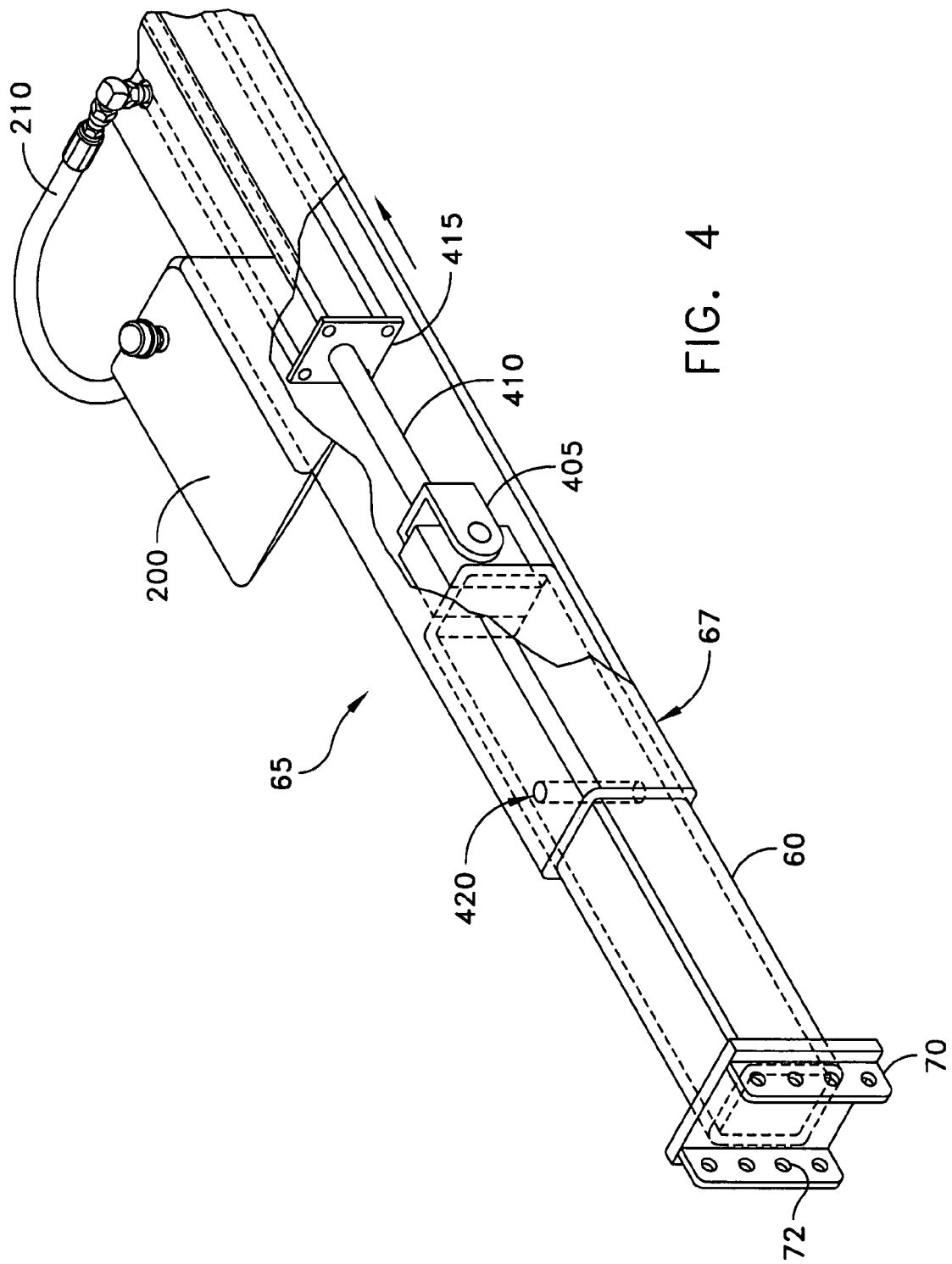
FIG. 4 shows a perspective view of the centre arm as per an embodiment of the invention.

Now referring to FIG. 4, an exemplary embodiment of the centre arm 65 is illustrated. A hydraulic cylinder 415 is fitted at the distal end of the hollow shell 67. A connecting rod 410 is connected to telescopic arm 60. The connecting rod 410 is adapted to act as piston within the hydraulic cylinder 415. The hydraulic cylinder 415 has a relatively small orifice (not shown) through which the cylinder 415 is in fluid connection with the hydraulic tank 220 via the hydraulic hose 210. In an exemplary embodiment, the orifice may have of a size of one-half (½) inch. Other such dimensions may be realized as is understood by one of ordinary skill in the art. The quantity of the hydraulic fluid expelled from the cylinder 415 in a given duration of time is inversely proportional to the size of the orifice. Accordingly, the amount of the impact energy absorbed by the hydraulic fluid is also inversely proportional to the size of the orifice. In general, the smaller the size of the orifice, the more time it takes to expel a given quantity of the hydraulic fluid, and more impact energy is absorbed by the hydraulic fluid. Conversely, the larger the size of the orifice, less time it takes to expel a given quantity of the hydraulic fluid, and less impact energy is absorbed by the hydraulic fluid. The hollow shell 67 and the telescopic arm 60 have openings to receive a fastening member such as a shear bolt 420.

In operation, the trailer assembly 1000 may be coupled to a conventional hitch, for example, a 20 ton Pentel hitch, mounted on a vehicle by adjusting the height of the hook 75 (via 78) to the hitch height of the vehicle, and connecting the trailer assembly and vehicle via the hook. The three telescopic arms 60, $10_a$ and $10_b$ are fully extended from their respective hollow shells 67, $30_a$ and $30_b$. The shorter lengths of the telescopic arms $10_a$ and $10_b$, compared to that of the telescopic arm 60 facilitates normal towing and enables turning of the vehicle without the two side-arms engaging the rear of the vehicle.

The hollow shell 67 of the center arm 65 is adapted to act as a hydraulic cylinder at its distal end. When the telescopic arm 60 slides into the hollow shell 67, the hydraulic fluid is pushed out of the outlet 280 into the hose 210, which carries the hydraulic fluid to the storage/overflow tank 200. Whereas, when the telescopic arm 60 slides out of the hollow shell 67, the hydraulic fluid flows from the storage/overflow tank 200 into the hose 210 and into the hydraulic cylinder at its distal end through the outlet 280.

When the assembly 1000 is in operational mode, it is hitched to a vehicle with all three telescopic arms 60, $10_a$ and $10_b$ fully extended from their respective hollow shells 67, $30_a$ and $30_b$. The fastening members $180_a$, $180_b$ and 420 are inserted through their respective openings in all the arms 65, $15_a$ and $15_b$. When there is an impact on the crash cushion 2000 mounted to the trailer assembly 1000, the impact causes the end (70) of the telescopic arm 60 to be urged against the end of the vehicle. Initially in response, the shear bolt 420 will break, and the telescopic arm 65 will start sliding into the hollow shell 67. As a result, the connecting rod member 410 will be pushed into the hydraulic cylinder 415 and the hydraulic fluid will be expelled out of the hydraulic cylinder 415 through the relatively small orifice (not shown) and into the storage/overflow tank 200 through the hydraulic hose 210. A substantial portion of the impact energy is thus absorbed by the hydraulic fluid. The extent of the energy absorption depends on the speed at which the hydraulic fluid is expelled out of the hydraulic cylinder 415, which depends on the size of the orifice in the hydraulic cylinder. If greater energy absorption is desired, another embodiment of the invention may include such a hydraulic system installed on one or both of the side arms $15_a$ and $15_b$, whereby more of the impact energy would be absorbed by the one or more additional hydraulic fluids contained in hollow shells $30_a$ and $30_b$ of the side arms $15_a$ and $15_b$.

As the impact continues, the stopper plates $20_a$ and $20_b$ on the telescopic arms $10_a$ and $10_b$ will come in contact with the back of the vehicle to which the assembly 1000 is attached. Continued application of the impact will urge the telescopic arms $10_a$ and $10_b$ back toward their respective hollow shells and (assuming sufficient impacting force) break the shear bolts $180_a$ and $180_b$. The telescopic arms $20_a$ and $20_b$ will begin to slide into their respective hollow shells $30_a$ and $30_b$ until stopped by engagement of the stop plates $20_a$, $20_b$ with the corresponding end portions of $30_a$, $30_b$. Since the side arms $15_a$ and $15_b$ are on either side of the center arm 65, they will prevent the trailer assembly 1000 from jack-knifing, especially in case of an off-axis impact, i.e. where the impact is off-set from the longitudinal axis of the center arm 65. Post-impact, the trailer assembly 1000 can be re-used by replacing the damaged crash cushion with a new cushion, extending the telescopic arm 60 and the telescopic arms $10_a$ and $10_b$ to their designated lengths such that the shear bolt holes in the arms 60, $10_a$ and $10_b$ are aligned with the respective openings (and replacing the shear bolts on the various arm members).

The foregoing description of the embodiments of this invention has been presented for purposes of illustration and description. It is not intended to be exhaustive or to limit the invention to the forms explicitly disclosed, as many modifications and variations are possible without departing from the scope and spirit of the present invention. For example, while the assembly 1000 has been shown as mounting to the rear of a vehicle, it is to be understood that the assembly may also be mounted to a front portion of a vehicle, depending on the application and the protection required for the vehicle.

Modifications and variations that may be apparent to a person skilled in the art are intended to be included within the scope of this invention.

What is claimed is:

1. A trailer crash attenuation assembly comprising:
   a first longitudinal hollow member, a portion at one end of said first longitudinal hollow member adapted to act as a hydraulic cylinder, said portion having a relatively small orifice;
   hydraulic fluid disposed in said hydraulic cylinder;
   a tank fluidly coupled to said relatively small orifice in said first longitudinal hollow member;
   a first longitudinal telescopic member adapted to slide into and out of said first longitudinal hollow member, said first longitudinal telescopic member adapted to act as a piston within said hydraulic cylinder;
   second and third longitudinal hollow members positioned substantially parallel to and on either side of said first longitudinal hollow member, said second and third longitudinal hollow members connected to said first longitudinal hollow member;
   second and third longitudinal telescopic members adapted to slide into and out of said second and third longitudinal hollow members respectively;
   a casing connected at its proximal end to said first, second and third longitudinal hollow members, said casing adapted at its distal end to receive a crash cushion; and
   a pair of wheels connected to said casing.

2. The trailer crash attenuation assembly according to claim 1, further comprising a hitch hook attached to said first longitudinal member to couple to a vehicle.

3. The trailer crash attenuation assembly according to claim 2, wherein the height of said hitch hook is adjustable.

4. The trailer crash attenuation assembly according to claim 1, further comprising:
   a first plate, said first plate connected to said first and second longitudinal members; and
   a second plate, said second plate connected to said first and third longitudinal members.

5. The trailer crash attenuation assembly according to claim 4, further comprising a ballast plate, said ballast plate positioned on each of said first and second plates.

6. The trailer crash attenuation assembly according to claim 1, further comprising a ballast plate positioned on each of said second and third longitudinal hollow members.

7. The trailer crash attenuation assembly according to claim 1 further comprising a stabilizer assembly, said stabilizer assembly comprising fourth and fifth longitudinal members, first end of each of said fourth and fifth longitudinal members connected to said first longitudinal hollow member, second end of each of said fourth and fifth longitudinal members connected to said casing.

8. The trailer crash attenuation assembly according to claim 7, wherein said connection between said first ends of said fourth and fifth longitudinal members and said first longitudinal hollow member is a pivotable connection.

9. The trailer crash attenuation assembly according to claim 1, further comprising a diaphragm, said diaphragm is connected to said first, second and third longitudinal members, said diaphragm is connected to said casing.

10. The trailer crash attenuation assembly according to claim 9, wherein position of said diaphragm relative to said casing is adjustable.

11. The trailer crash attenuation assembly according to claim 1,
    wherein said first, second and third longitudinal hollow members have square cross-section;
    wherein said first, second and third telescopic longitudinal members have square cross-section.

12. The trailer crash attenuation assembly according to claim 1, wherein said first longitudinal telescopic member when fully extending out of said hollow member extends a longitudinal distance beyond that of said second and third longitudinal telescopic members when fully extending out of said second and third longitudinal hollow members.

13. The trailer crash attenuation assembly according to claim 1 further comprising a stopper plate on a first end of each of said second and third longitudinal telescopic members.

14. The trailer crash attenuation assembly according to claim 1 wherein said first telescopic member comprises:

a first member; and a second member, said second member connected to said first member, wherein said second member is adapted to act as a piston within said hydraulic cylinder.

15. The trailer crash attenuation assembly according to claim 1 further comprising a cylinder, said cylinder positioned at the distal end of said first longitudinal member, said cylinder adapted to act as a hydraulic cylinder, wherein said hydraulic fluid is disposed in said cylinder, said cylinder having a relatively small orifice and being in fluid communication with said tank.

* * * * *